Feb. 12, 1957 L. B. FULLER ET AL 2,780,956
CIRCLE TOLERANCE GAUGE FOR OPTICAL COMPARATORS
Filed Jan. 28, 1955
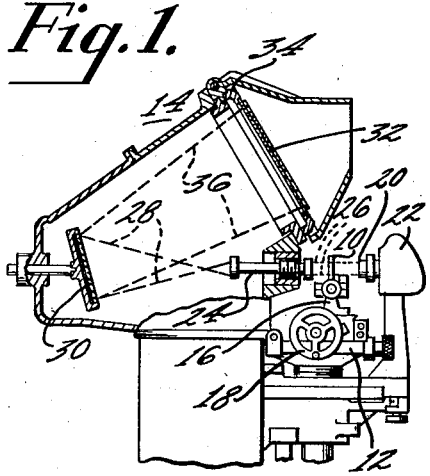
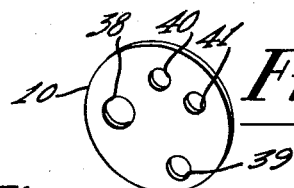
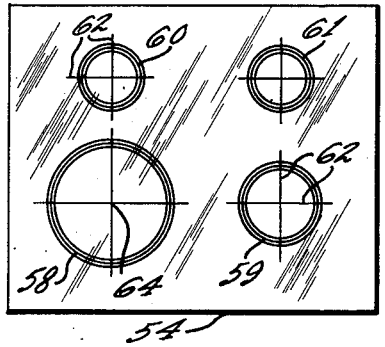
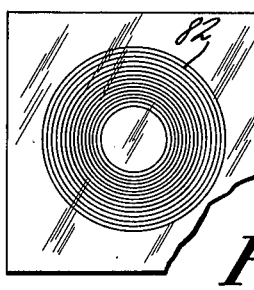
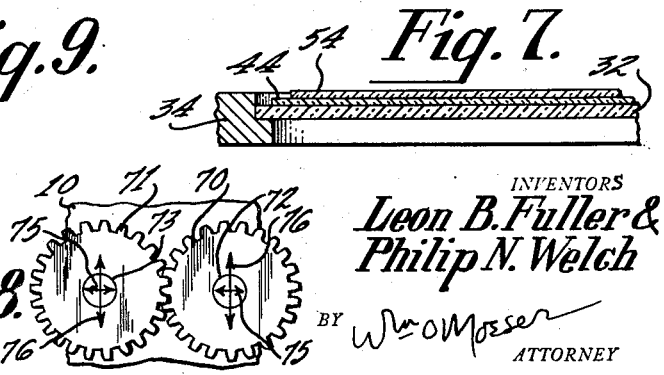
INVENTORS
Leon B. Fuller &
Philip N. Welch
BY
ATTORNEY

United States Patent Office 2,780,956
Patented Feb. 12, 1957

2,780,956

CIRCLE TOLERANCE GAUGE FOR OPTICAL COMPARATORS

Leon B. Fuller, Springfield, and Philip N. Welch, Chester, Vt., assignors to Jones and Lamson Machine Company, a corporation of Vermont Application January 28, 1955, Serial No. 484,664

5 Claims. (Cl. 88—24)

The present invention relates to optical comparators for the inspection and measurement of structural parts and objects, by comparison with a master chart or outline on which a magnified shadow of the part or object is projected. Such devices are well-known and find extensive use in industry for the inspection and measurement of duplicate parts.

In a well-known type of optical comparator, a parallel beam of light is directed upon a part to be inspected or measured. A projection lens system and an optically flat mirror throw a magnified shadow of the part upon a receiving or viewing screen of translucent material such as a sheet of ground glass. The outline of the magnified shadow on the screen is compared with an overlay master chart or outline. The part passes inspection when the outline of the magnified shadow and the master chart outline coincide in a predetermined manner.

More particularly, the present invention relates to master charts or overlay outline means for the screen of an optical comparator, and has for its primary object to provide a master chart or overlay outline means which effectively may operate as an improved circle tolerance gauge in connection with an optical comparator.

It is also an object of this invention to provide an improved method and means for measuring the center position, size and roundness of circular openings or holes in plates, frames and other mechanical bodies with an optical comparator or the like.

In the production of machines and other mechanical devices, one or more circular openings or holes may be provided in a body of material for the reception of shafts, bearings or other elements which depend upon the location of the centers, the sizes and the roundness of said openings or holes for precise location or spacing. The tolerances as to center location, size and roundness of spaced holes such as shaft bearing openings in a bearing plate or other supporting element are determined by the design of the machine of which it is a part.

It will be seen that the spacing dimensions between certain shaft openings or centers may often be of great importance and the position tolerance for the centers of such openings having been determined, should be applicable to machine parts accurately and rapidly.

It is therefore a further object of this invention to provide an improved tolerance gauge for optical comparators that effectively will compare the center location tolerances or tolerance envelopes of the projected or magnified holes or openings in an object or machine part with the actual centers of such projected openings or holes. With this system the actual center of a chart circle or group of circles representing a magnified opening or hole, may be caused to fall within or without the center location tolerance range for such centers, and thereby determine the correct location of one opening with respect to another in a machine part or element.

In accordance with the invention, a part to be measured or gauged, such as a flat plate having a plurality of spaced openings, is magnified in a suitable optical comparator and the magnified shadow of the part is viewed upon a receiving or viewing screen. A chart, of translucent material, forming part of the gauge is placed over and substantially covers the screen. The projected outlines of the holes or openings on the screen are viewed in comparison with indicia such as geometric figures carried by the chart in positions to indicate the location tolerances or tolerance envelopes for the centers of such openings in the particular machine part being gauged.

A further translucent or transparent overlay chart is placed on the first or fixed chart and carries a series of grouped indicia such as groups of concentric circles and crossed center lines therefor. One circle of each group may be the exact reproduction of the desired size and shape of the magnified and projected hole to the gauged or measured. The overlay chart carries one such multiple circle gauge for each opening to be gauged.

With this arrangement, the part to be gauged appears on the screen in darkness, with circles of light where the holes or openings are located. The indicia on the gauge elements are opaque and therefore are readily visible when these elements are in place on the screen. However, if merely crossed center lines are placed on the screen or chart for each opening, it has been found that these are not sufficient to judge accurately whether the hole or opening is in the proper place.

In the present system, when the overlay chart is aligned with the projected image of the opening to be measured or gauged, the circular figure should coincide with the projected image of the opening within the tolerance lines and the center should fall within the confines of the center location tolerance envelope on the fixed chart. This makes for accurate and rapid gauging of parts.

In accordance with the invention therefore, it will be seen that a first and a second chart, of ground glass or other translucent material forming part of the gauge, are arranged to occupy the viewing area. The one chart is effectively fixed and carries one set of gauge indicia while the second or overlay chart bears other gauge indicia. The indicia on the overlay chart may be several concentric circles formed with opaque lines, to define tolerance in terms of hole size. Center position tolerance is indicated on the fixed chart by geometric figures of opaque material which are projected onto or viewed through the overlay chart in comparison with the hole center cross line on the latter. Because of the magnification in the comparator the tolerances are greatly magnified on the screen and may readily be seen by an operator and judged accordingly very accurately.

Furthermore, it will been that, in accordance with the invention, each circle can be inspected individually to see if it is round, of proper size or diameter, and that the crossed center lines fall within the center tolerance locations on envelopes.

Likewise, each circle can be inspected in multiples of two or more to see if the several center distances are properly related, where the openings are adapted to carry shafts or provide bearings for shafts that must operate with predetermined distances between centers.

The novel features that are considered to be characteristic of this invention, however, are set forth with particularity in the appended claims. The invention itself, both as to its organization and method of operation, as well as additional objects and advantages thereof will best be understood from the following description when read in connection with the accompanying drawings in which:

Figure 1 is a side view, in elevation and partly in section, of the upper main portion of an optical comparator arranged for operation in accordance with the invention;

Figure 2 is an enlarged plan view of the screen and chart ring of the comparator of Figure 1, showing a portion of a gauge embodying the invention in place on the screen;

Figure 3 is an enlarged plan view, in perspective, of a machine part having a plurality of circular openings to be gauged as appear in outline in Figure 2, and as shown mounted in the comparator of Figure 1;

Figure 4 is an overlay chart or second gauge part bearing gauging indicia for the projected images of the openings of the part to be gauged as shown in Figure 2, in accordance with the invention;

Figures 5 and 6 are fragmentary plan views of the screen and chart of Figure 2, with the overlay chart of Figure 4 in place thereon for gauging one of the circular openings in accordance with the invention;

Figure 7 is a fragmentary sectional view of the screen, fixed chart and overlay chart of Figure 5 taken on the section line 8—8 of Figure 5, in the direction of the arrows, to show further details of the operational arrangement of the charts and screen;

Figure 8 is a fragmentary view, on an enlarged scale, of a portion of the part to be gauged shown in Figure 2 with meshing pinions located thereon with respect to two of the openings to illustrate a principle of operation of the invention; and Figure 9 is a plan view of a modification, in accordance with the invention, of an overlay chart as shown in Figure 4.

Referring to the drawing, wherein like reference numerals throughout the various figures designate like parts, and more particularly referring to Figures 1, 2 and 3, a part to be gauged 10 is placed on the table 12 of an optical comparator 14 in suitable mounting bracket means 16 fixed to the table 12. The part is adjusted by means of a handwheel 18 to a suitable position between the condensing lens 20 of a projection lamp 22 and the projection lens 24 of the comparator to intercept the collimated beam of light, indicated by the dotted lines 26, and be projected, as indicated by the dash lines 28, onto the optically flat mirror 30 of the comparator and thence to the viewing screen 32 which is mounted in the chart ring 34.

As seen in Figure 1 by the projection lines 36, the image is greatly enlarged and appears on the screen, with the several circular openings 38, 39, 40 and 41 in the part 10 also greatly enlarged. Since the screen is otherwise dark, the projected images of the openings in the part 10 appear on the screen as enlarged circles of light as indicated by the dotted circles 38', 39', 40' and 41' in Figure 2.

The part 10 to be gauged has four spaced circular openings in the present example, of different sizes, and may be a flat plate as shown or a frame or casting with holes or similar openings for shaft bearings and the like. Such openings must be inspected and gauged, not only for correct size or diameter, but also for circular configuration and spacing tolerance, center to center. Knowing the magnification of the comparator, which may be of the order of from 20 to 50 for example, the center tolerance envelopes or center location tolerances may be determined and accurately placed, as shown in Figure 2, on a fixed chart 44 which fits into the chart ring and is held in place as by suitable chart hold-down clips 45. These may be moved to permit the chart to be changed for the gauging of different pieces of equipment.

In the region of the center of each projected hole or circle are rectangular tolerance envelopes 48, 49, 50 and 51 respectively for the circular images 38', 39', 40' and 41' as shown. These are drawn in ink or suitable opaque material or otherwise marked, on the chart 44, of a size to indicate the projected or enlarged tolerances for the center positions of the circles representing the openings in the object being gauged. These are marked as shown, preferably with width and height in inches, to show the actual tolerance limits in different directions, permitted on the part for the center positions of each opening. With a magnification of 50 it will be seen that a tolerance of .002" will appear on the chart as a readily visible one-tenth of an inch.

Referring now to Figures 4, 5, 6 and 7 along with the preceding figures, an overlay chart 54 of translucent material such as ground glass or transparent glass in a thin sheet, upon which gauging indicia such as four sets of concentric circles 58, 59, 60 and 61, are marked, is provided for placement over the fixed chart 44 of Figure 2 as indicated, as part of the gauging means to determine the circle tolerance of the openings.

These sets or groups of circles in the present example, are each three in number, the center circle of each set being drawn to the projected exact size of the opening desired and the inner and outer circles of each set or group being the inner and outer tolerance limits for the size of the projected circles or openings. These sets or groups of circles may be arranged in spaced aligned arrangement as shown in Figure 4 or may be laid out with the exact desired spacing corresponding to the desired exact spacing of the enlarged images of the openings. In any case each set of circles is provided with crossed center lines 62 indicating the exact center of the concentric set of circles in each group.

When placed over the fixed chart as shown in Figure 5, for example, and the center circle of the group 58 falls exactly in alignment with the projected image 38' of one of the openings and the crossed center lines intersect as indicated at 64 within the limits of the center location tolerance envelope 48, for example, the opening or hole is both of correct size and is correctly located and is thus gauged and passed as acceptable.

Whereas, in the arrangement shown in Figure 6, the overlay chart circles 58, for example, fall within the projected outline 38", as here the opening 38 is oversized, and the center lines intersect as indicated at 64, outside the tolerance envelope or location tolerance 48, then the opening or hole is outside of limits both with respect to size and location and is gauged as not passing inspection.

With this arrangement it will be seen that parts having a number of openings may rapidly be gauged in succession in the comparator by projection onto the screen and fixed chart while the overlay is moved to register the centers with respect to the tolerance envelopes or center location tolerances. Thus center, size and roundness of each opening are gauged rapidly and accurately. Since this method separates size, roundness and location, and separately identifies each of these possible errors, adequate information is thus available to intelligently correct the machine tool or process, thereby preventing further scrappage.

Referring to Figure 8, two meshing pinions 70 and 71 are shown mounted on shafts 72 and 73 respectively which are journalled in the openings 40 and 41 of the gear plate 10. The arrowed lines 75 and 76 drawn on each shaft indicate by their relative length the permissible position tolerance of the centers of these shafts in two directions for proper operation of the pinions. For gear placement it may be seen that considerable latitude is permissible in the direction of the longer arrows 76 and less latitude in the direction of the shorter arrows 75. Thus the tolerance zone or envelope, or position tolerance, for the centers of the openings 40 and 41 are the elongated rectangles 50 and 51 as shown in Figure 2 more clearly.

It will be seen, however, that the center position envelope or tolerance may be a rectangle or other geometric figure depending upon the particular limits of the spacing tolerances for the openings in the same machine part. Here again it may be pointed out that because of the high degree of magnification of the object or part, a tolerance measurable in thousandths of an inch, such as .004", will appear on the chart as, for example, two tenths of an inch, and can easily be viewed and judged accurately by an operator.

For universal use for gauging the size and roundness of large and small circles alike, a translucent overlay chart 80, as shown in Figure 9 may be constructed of suitable material, such as ground or clear glass, and have embossed, engraved or printed thereon a large number of concentric circles indicated by the group 82. The smallest of the circles is the exact size of the projected image of the smallest opening or hole to be gauged. With this arrangement, the next adjacent radially inner and outer circles serve as tolerance markers for any particular circle being used as a gauge. As in Figure 4, a plurality of multiple-circle groups of indicia may be placed on the chart and used in the same manner as hereinbefore described.

From the foregoing description it will be seen that a circle tolerance gauge for optical comparators may comprise two or more translucent overlay charts for the screen, each overlay chart bearing opaque or substantially opaque indicia on its surface, positioned to determine center position, size and roundness of the circular openings or holes in a machine part or object to be gauged by means of its projected image. In the present preferred embodiment of the invention, the first chart is substantially fixed in use. This has etched, printed or embossed or otherwise marked thereon, lines defining geometric figures such as rectangles representing the limits of departure of the centers of the openings from predetermined positions and in some cases in the spacing between two or more of the openings.

On the second chart, further indicia are provided in the form of lines etched, printed or embossed or otherwise marked thereon as concentric circles which provide the size and roundness desired in the projected images of the openings, with inner and outer tolerance circles on either side thereof, together with crossed center lines showing the exact centers of each group of circles. This chart, generally called the overlay chart, together with the fixed or first chart, provide an effective and low cost gauge means for measuring holes and openings in machine parts and objects by projection in an optical comparator. The overlay chart provides circle tolerance rings which determine or define the tolerance in terms of hole size and the exact centers of the concentric circles by means of the crossed center-lines therefor on one surface of the chart.

The fixed chart defines permissible center position variation which is delineated by geometric closed figures also on one surface of the chart, and generally in the form of rectangles.

With such a system, it is relatively easy to gauge rapidly a succession of duplicate parts having openings therein, for determining the center location, the size and the roundness of each with a high degree of accuracy, wholly visually.

What is claimed is:

1. A circle tolerance gauge for an optical comparator having a translucent viewing screen for projected images of parts to be gauged, comprising in combination, a first translucent chart for mounting on said screen having geometric figures on a surface thereof defining center position tolerance for circular openings in an object to be gauged, and an overlay chart for mounting on said first chart having circle tolerance rings for said circular openings comprising a series of concentric circles and crossed center lines therefor for defining the tolerance of said openings in terms of hole size, said last named chart being movable with respect to the first chart to align said tolerance rings with projected images of said holes on the first chart and screen.

2. The method of gauging circular openings in mechanical bodies with an optical comparator or the like which comprises, projecting an image of a mechanical body on a viewing screen of translucent material to provide illuminated images of circular openings therein, applying a translucent overlay tolerance chart to said screen to define the limits of the center position of said openings, applying a second chart conjointly with said first chart to define the size, roundness and center position of said openings in registration with the indicia of said first chart, and viewing the images of the openings through both charts simultaneously to gauge said openings.

3. The method of measuring center location, size and roundness of circular openings in a mechanical body which comprises, projecting light through said openings onto a viewing screen of translucent material, defining the limits of center position tolerance for said openings by a translucent overlay chart having center position tolerance envelopes visible in registration with the projected images of said openings, applying a series of concentric circles on a second translucent overlay chart to the projected images of said openings for visibly comparing size and roundness therewith, providing crossed center lines for said concentric circles on said second chart and applying the intersection of said crossed center lines to the tolerance envelopes on the first overlay chart to determine the degree of registration therewith as a measure of the accuracy of the center positions of said openings.

4. A circle tolerance gauge for optical comparators and the like, comprising a first translucent chart providing center position variation tolerance defined by visible geometric closed figures on a surface thereof, and a second overlay chart movable with respect to the first chart providing visible circle tolerance rings in concentric relation, and crossed center lines therefor on a surface of said second chart.

5. A circle tolerance gauge for an optical comparator having a translucent viewing screen, comprising in combination, a first and a second translucent overlay chart for said screen, each chart having substantially opaque indicia on the surface thereof positioned to determine center position, size and roundness of circular openings in a machine part to be gauged by means of its projected image on said screen, said first overlay chart being adapted to lie adjacent to said screen substantially fixed in position and defining visible geometric figures representing the limits of departure of the centers of the said openings from predetermined positions, and said second chart being adapted to be laid over said first chart and providing visible concentric circle indicia having crossed center lines for gauging the size, and roundness of said projected openings on said screen, and the position of said centers.

References Cited in the file of this patent
UNITED STATES PATENTS

| | | |
|---|---|---|
| 2,159,035 | McGrath | May 23, 1939 |
| 2,451,155 | De Boer | Oct. 12, 1948 |
| 2,507,138 | Bliss | May 9, 1950 |
| 2,628,528 | Dietrich | Feb. 17, 1953 |